(12) United States Patent
Kaji et al.

(10) Patent No.: US 10,376,918 B2
(45) Date of Patent: Aug. 13, 2019

(54) METHOD OF FORMING DRY COATING FILM AND PAINT USED FOR THE SAME

(71) Applicant: NIPPON PAINT MARINE COATINGS CO., LTD., Kobe-shi, Hyogo (JP)

(72) Inventors: Hirokazu Kaji, Neyagawa (JP); Hideyuki Kondo, Neyagawa (JP); Atsuhiro Yamashita, Neyagawa (JP); Shinichi Ishihara, Neyagawa (JP)

(73) Assignee: NIPPON PAINT MARINE COATINGS CO., LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/034,716

(22) PCT Filed: May 20, 2015

(86) PCT No.: PCT/JP2015/064412
§ 371 (c)(1),
(2) Date: May 5, 2016

(87) PCT Pub. No.: WO2016/042840
PCT Pub. Date: Mar. 24, 2016

(65) Prior Publication Data
US 2016/0263617 A1    Sep. 15, 2016

(30) Foreign Application Priority Data

Sep. 16, 2014    (JP) ................................. 2014-187786

(51) Int. Cl.
*B05D 3/00*       (2006.01)
*C09D 201/00*     (2006.01)
(Continued)

(52) U.S. Cl.
CPC ............ *B05D 3/007* (2013.01); *C08G 59/245* (2013.01); *C08G 59/502* (2013.01); *C09D 7/70* (2018.01);
(Continued)

(58) Field of Classification Search
CPC ...................................... B05D 3/007
See application file for complete search history.

(56) References Cited

U.S. PATENT DOCUMENTS 3,275,332 A * 9/1966 May ................... F16J 15/3276
                                                    277/573
4,197,233 A * 4/1980 Marshall ............. C08G 59/226
                                                    523/122

(Continued)

FOREIGN PATENT DOCUMENTS

| CN | 1182642 A | 5/1998 |
| CN | 1341493 A | 3/2002 |

(Continued)

OTHER PUBLICATIONS https://en.wikipedia.org/wiki/Color_difference screen captured Mar. 14, 2017.*

(Continued)

*Primary Examiner* — Nathan H Empie
(74) *Attorney, Agent, or Firm* — Sughrue Mion, PLLC (57) ABSTRACT

A method for forming a dry coating film on a surface of an object to be coated including the steps of: setting a dry coating film thickness T not smaller than 300 μm; formulating or preparing a colored paint containing a binder resin and a color pigment and satisfying conditions that (a) a scaly pigment having a prescribed shape is further contained, (b) a content of the scaly pigment is from 5 to 45 volume % in components forming the coating film, (c) a coating film having the thickness T hides the surface, and (d) a color (Continued)

difference between the coating film having the thickness T and a coating film having a thickness of 0.7 T is not smaller than 2.0; coating the surface with the colored paint until the surface is hidden; and drying the coating film, as well as a paint used therefor are provided.

12 Claims, 4 Drawing Sheets

(51) Int. Cl.
*C09D 163/00* (2006.01)
*C08G 59/24* (2006.01)
*C08G 59/50* (2006.01)
*C09D 7/40* (2018.01)
C08K 3/22 (2006.01)
C08K 3/34 (2006.01)
C08K 3/40 (2006.01)
C08K 7/00 (2006.01)
C08K 3/013 (2018.01)

(52) U.S. Cl.
CPC ......... *C09D 163/00* (2013.01); *C09D 201/00* (2013.01); *C08K 3/013* (2018.01); *C08K 3/22* (2013.01); *C08K 3/34* (2013.01); *C08K 3/40* (2013.01); *C08K 7/00* (2013.01); *C08K 2003/2237* (2013.01); *C08K 2003/2241* (2013.01)

(56) References Cited

U.S. PATENT DOCUMENTS

| | | | | |
|---|---|---|---|---|
| 5,266,105 | A | * 11/1993 | Tsuneta | ................ C09D 5/1662 106/16 |
| 2007/0032573 | A1 | * 2/2007 | Yanagase | ............. A61K 8/0262 523/200 |
| 2009/0148610 | A1 | 6/2009 | Nishimori et al. | |
| 2009/0185867 | A1 | * 7/2009 | Masters | .................. F16L 1/123 405/216 |
| 2010/0047620 | A1 | * 2/2010 | Decker | .................... B05D 7/54 428/688 |
| 2010/0210745 | A1 | * 8/2010 | McDaniel | ............. C09D 5/008 521/55 |
| 2012/0294825 | A1 | * 11/2012 | Ehara | .................... C09D 5/165 424/78.09 |

FOREIGN PATENT DOCUMENTS

| | | |
|---|---|---|
| CN | 102821872 A | 12/2012 |
| JP | 56-44073 A | 4/1981 |
| JP | 62-218459 A | 9/1987 |
| JP | 04145979 A | 5/1992 |
| JP | 10-216621 A | 8/1998 |
| JP | 2000-037659 A | 2/2000 |
| JP | 2000-038540 A | 2/2000 |
| JP | 2001-81408 A | 3/2001 |
| JP | 2002-066445 A | 3/2002 |
| JP | 2002-080787 A | 3/2002 |
| JP | 2005-334759 A | 12/2005 |
| JP | 2008-255259 A | 10/2008 |
| JP | 2011-088132 A | 5/2011 |
| JP | 2012-005934 A | 1/2012 |
| JP | 5269832 B2 | 8/2013 |
| WO | 2007/023934 A1 | 3/2007 |

OTHER PUBLICATIONS

International Search Report for PCT/JP2015/064412 dated Jul. 7, 2015.
Communication dated Jan. 5, 2017 from the State Intellectual Property Office of the P.R.C., in counterpart Chinese application No. 201580003020.7.
Communication dated May 30, 2017 from the Korean Intellectual Property Office in counterpart application No. 10-2016-7017146.

* cited by examiner

# METHOD OF FORMING DRY COATING FILM AND PAINT USED FOR THE SAME

CROSS REFERENCE TO RELATED APPLICATIONS

This application is a National Stage of International Application No. PCT/JP2015/064412 filed May 20, 2015, claiming priority based on Japanese Patent Application No. 2014-187786 filed Sep. 16, 2014, the contents of all of which are incorporated herein by reference in their entirety.

TECHNICAL FIELD

The present invention relates to a coating film formation method which allows formation of a thick dry coating film in a simplified manner while insufficiency in film thickness is suppressed and a paint used for the same.

BACKGROUND ART

Formation of a dry coating film by coating a surface of an object to be coated with a paint containing a prescribed component (a paint composition) followed by drying in order to provide desired characteristics to the surface is a well-known technique. In order to provide desired characteristics by forming a coating film, control of a film thickness of the dry coating film is important. When the formed dry coating film does not have a sufficient film thickness, characteristics to be provided tend to be insufficient.

Control of a film thickness of the coating film, however, is not an easy operation. A conventional method of controlling a film thickness includes i) a method of measuring a thickness of a coating being formed, that is, in a wet state (before drying), with a wet gauge in order to check in advance whether or not a target dry film thickness (for sufficiently obtaining desired physical properties) will be obtained and calculating and checking a dry film thickness based thereon and ii) a method of measuring a film thickness of a dry coating film directly with an electromagnetic coating thickness tester in order to check whether or not a film thickness of a dry coating film has reached a target film thickness.

In any of the methods above, however, it has been virtually difficult to control a film thickness particularly in cases as follows.

1) A case that an area of a surface of an object to be coated which is coated with a paint is large, for example, a case of marine vessels. In this case, it is extremely troublesome and actually difficult to measure a film thickness with a wet gauge or an electromagnetic coating thickness tester over the entire surface of the object to be coated.

2) A case that a surface of an object to be coated which is coated with a paint includes a surface of which coating is not easy. A film thickness tends to vary at the surface of which coating with a paint is not easy. On the other hand, it is often difficult and troublesome to measure a film thickness of a coating film formed on such a surface with a wet gauge or an electromagnetic coating thickness tester.

3) A case that a target film thickness of a coating film formed in a single-coating process is large. As a coating film to be formed in the single-coating process is thicker, a frequency of measurement of a thickness of the coating being formed tends to be often and control of a film thickness becomes troublesome. The "single-coating process" means that a series of operations from coating with a paint until drying treatment is performed once, and therefore, a coating film formed in the single-coating process refers to a coating film formed by coating by application of a paint once or a plurality of times followed by single drying treatment.

As a method for solving the conventional problems as described above, Japanese Patent Laying-Open No. 10-216621 (PTD 1) and Japanese Patent Laying-Open No. 2002-066445 (PTD 2) disclose formation of a coating film with the use as a paint for forming a coating film, of a paint called a "film thickness determination paint" which allows determination as to whether or not a defined film thickness has been reached based on visual observation by a coating worker of change in color difference of a wet coating being formed.

CITATION LIST

Patent Document

PTD 1: Japanese Patent Laying-Open No. 10-216621
PTD 2: Japanese Patent Laying-Open No. 2002-066445

SUMMARY OF INVENTION

Technical Problem

Any of the film thickness determination paints described in PTDs 1 and 2 is a paint which is used for forming a coating film having a target dry film thickness not smaller than 100 μm and formulated to satisfy the following relation in connection with a color difference by adjusting a content of a color pigment contained therein:

(a) a color difference between the film thickness determination paint and an object to be coated being not smaller than 20;

(b) a color difference between a coating film having a target dry film thickness and a coating film having a dry film thickness smaller than (target dry film thickness−50) μm being not smaller than 2; and (c) a color difference between a coating film having a target dry film thickness and a coating film having a dry film thickness exceeding (target dry film thickness+50) μm being smaller than 1.

Among the above, (b) is particularly important. Unless a difference between a hue of a coating film having a thickness quite close to a target film thickness and a hue of a coating film which has reached the target film thickness is clear, it is difficult for a coating worker to visually determine whether a wet coating being formed has reached the target film thickness of a dry coating film or is still insufficient in film thickness.

Therefore, determination of a film thickness is more readily made as a color difference between a coating film having a thickness quite close to a target film thickness and a coating film which has reached a target film thickness is greater. A new problem, however, has newly been found that when a relatively thick coating film is formed in a single-coating process, it is difficult to achieve a sufficiently great color difference. More specifically, when a target dry film thickness of a coating film formed in a single-coating process is up to approximately 250 μm (a target dry film thickness in Examples in PTD 1 being 125 μm and a target dry film thickness in Examples in PTD 2 being 250 μm at the maximum), a color difference could be great to some extent and a film thickness could relatively readily be determined in forming a coating film having a desired film thickness in accordance with a formulation technique described in these patent documents.

A thick coating film as exceeding 250 μm has also conventionally been formed on an object to be coated, as represented by an anti-corrosive coating film (a rustproof coating film) formed on a surface of marine vessels, marine structures such as bridges, and surfaces of structures made of steel such as plants. Such a thick coating film, however, has conventionally normally been formed not in a single-coating process but in a multiple-coating process (a coating method of performing a series of steps from coating to drying a plurality of times for recoating dry coating films).

Recently, however, a coating method of forming a thick coating film, for example, not smaller than 300 μm not in a multiple-coating process but in a single-coating process has been adopted. Then, a problem has arisen that it is difficult to achieve a sufficiently great color difference between a coating film having a thickness quite close to a target film thickness and a coating film which has reached a target film thickness and it is not easy to determine whether a wet coating film has reached the target film thickness or is still insufficient in film thickness.

Then, an object of the present invention is to provide a coating film formation method allowing formation of a dry coating film in a simplified manner while insufficiency in film thickness is suppressed even in formation of a thick coating film not smaller than 300 μm in a single-coating process and a paint used for the same.

Solution to Problem

The present invention provides a coating film formation method and a colored paint below.

{1} A method for forming a dry coating film on a surface of an object to be coated, including the steps of:
[1] setting a dry coating film thickness T (T being selected from a range not smaller than 300 μm);
[2] formulating or preparing a colored paint containing at least a binder resin and a color pigment and satisfying conditions that
   (a) a scaly pigment having an average particle size from 10 to 300 μm, an average thickness from 2 to 50 μm, and an aspect ratio from 2 to 100 is further contained, the aspect ratio being defined as the average particle size/the average thickness,
   (b) a content of the scaly pigment is from 5 to 45 volume % in components forming the coating film,
   (c) a coating film having a dry coating film thickness T and formed of the colored paint hides the surface of the object to be coated, and
   (d) a color difference $\Delta E1$ between the coating film having the dry coating film thickness T and formed of the colored paint and a coating film having a dry coating film thickness of 0.7 T and formed of the colored paint is not smaller than 2.0;
[3] coating the surface of the object to be coated with the colored paint until the surface is hidden by the coating film formed of the colored paint; and
[4] obtaining a dry coating film by drying the coating film obtained in the step [3].

{2} The method described in {1}, wherein the colored paint further satisfies a condition (e) that a color difference $\Delta E2$ between the coating film having the dry coating film thickness T and formed of the colored paint and a coating film having a dry coating film thickness of 1.3 T and formed of the colored paint is smaller than 1.

{3} The method described in {1} or {2}, wherein the colored paint further satisfies a condition (f) that a color difference $\Delta E3$ between the coating film having the dry coating film thickness T and formed of the colored paint and the surface of the object to be coated is not smaller than 20.

{4} The method described in any of {1} to {3}, wherein the coating film having the dry coating film thickness T and formed of the colored paint has a contrast ratio from 0.90 to 0.98.

{5} The method described in any of {1} to {4}, wherein the colored paint further contains a curing agent.

{6} The method described in {5}, wherein the curing agent has a Gardner color scale not greater than 18.

{7} The method described in any of {1} to {6}, wherein a content of the color pigment is from 0.01 to 3 volume % in the components forming the coating film.

{8} The method described in any of {1} to {7}, wherein the scaly pigment is at least one type of pigment selected from the group consisting of talc, mica, and glass flake.

{9} The method described in any of {1} to {8}, wherein the color pigment contains titanium dioxide.

{10} The method described in any of {1} to {9}, wherein the surface of the object to be coated is made of steel or a surface of an undercoat layer of the object to be coated.

{11} A colored paint used for forming a dry coating film having a dry coating film thickness T (T being selected from a range not smaller than 300 μm) on a surface of an object to be coated, containing at least a binder resin and a color pigment, and satisfying conditions that
   (a) a scaly pigment having an average particle size from 10 to 300 μm, an average thickness from 2 to 50 μm, and an aspect ratio from 2 to 100 is further contained, the aspect ratio being defined as the average particle size/the average thickness,
   (b) a content of the scaly pigment is from 5 to 45 volume % in components forming the coating film,
   (c) a coating film having a dry coating film thickness T and formed of the colored paint hides the surface of the object to be coated, and
   (d) a color difference $\Delta E1$ between the coating film having the dry coating film thickness T and formed of the colored paint and a coating film having a dry coating film thickness of 0.7 T and formed of the colored paint is not smaller than 2.0.

{12} The colored paint described in {11} further satisfies a condition (e) that a color difference $\Delta E2$ between the coating film having the dry coating film thickness T and formed of the colored paint and a coating film having a dry coating film thickness of 1.3 T and formed of the colored paint is smaller than 1.

{13} The colored paint described in {11} or {12} further satisfies a condition (f) that a color difference $\Delta E3$ between the coating film having the dry coating film thickness T and formed of the colored paint and the surface of the object to be coated is not smaller than 20.

{14} The colored paint described in any of {11} to {13}, wherein the coating film having the dry coating film thickness T and formed of the colored paint has a contrast ratio from 0.90 to 0.98.

{15} The colored paint described in any of {11} to {14} further contains a curing agent.

{16} The colored paint described in {15}, wherein the curing agent has a Gardner color scale not greater than 18.

{17} The colored paint described in any of {11} to {16}, wherein a content of the color pigment is from 0.01 to 3 volume % in the components forming the coating film.

{18} The colored paint described in any of {11} to {17}, wherein the scaly pigment is at least one type of pigment selected from the group consisting of talc, mica, and glass flake.

{19} The colored paint described in any of {11} to {18}, wherein the color pigment contains titanium dioxide.

Advantageous Effects of Invention

According to the present invention, even when a thick coating film not smaller than 300 μm is formed in a single-coating process, a dry coating film can be formed in a simplified manner while insufficiency in film thickness is suppressed.

DESCRIPTION OF EMBODIMENTS

The present invention will be described hereinafter in detail.

A coating film formation method according to the present invention is a method for forming a dry coating film on a surface of an object to be coated, and includes the steps of setting a dry coating film thickness T (a dry coating film thickness setting step), formulating or preparing a colored paint containing at least a binder resin and a color pigment and satisfying conditions (a) to (d) which will be described later (a colored paint preparation step), coating the surface of the object to be coated with the colored paint until the surface is hidden by a coating film formed of the colored paint (a coating step), and obtaining a dry coating film by drying the coating film (a wet coating film) obtained in the coating step (a drying step).

In the coating film formation method according to the present invention, a prescribed colored paint (a colored paint composition) is employed as a paint for forming a dry coating film. The colored paint is a paint having a "film thickness determination function" allowing determination as to whether or not a prescribed film thickness has been reached based on visual observation of a hue of a coating film (wet coating film) being formed. A colored paint according to the present invention will initially be described below in detail.

<Colored Paint>

The colored paint according to the present invention contains at least a binder resin and a color pigment. The colored paint can be a paint used for various applications, and can be a paint for every application required to form a dry coating film to a prescribed film thickness. An anti-corrosive paint (a rustproof paint) represents one example of the colored paint. A blended component which can be contained in a colored paint as an anti-corrosive paint will be described below.

(1) Binder Resin

A binder resin can be: an epoxy resin; an alkyd resin; a (meth)acrylic resin; a urethane resin; a vinyl-based resin such as a vinyl chloride based resin and a vinyl acetate based resin; a chlorinated olefin resin; chlorinated rubber; or a modified product thereof. The binder resin may be composed of one type of resin or a mixture of two or more types of resin. The binder resin may be solid or liquid. Among these, an epoxy resin or a modified product thereof is suitably used.

Specific examples of the epoxy resin include: a bisphenol epoxy resin such as a bisphenol A type epoxy resin, a bisphenol F type epoxy resin, a bisphenol S type epoxy resin, a bisphenol B type epoxy resin, and a bisphenol AD type epoxy resin; a novolac type epoxy resin such as a phenol novolac type epoxy resin and a cresol novolac type epoxy resin; a biphenyl type epoxy resin; a naphthalene type epoxy resin; a reactive diluent epoxy ester type epoxy resin; and a glycidyl amine type epoxy resin. Only one type of epoxy resin may be used alone or two or more types of epoxy resin may be used together.

Specific examples of the modified epoxy resin include a carboxylic acid modified epoxy resin, an amine modified epoxy resin, a phosphoric acid modified epoxy resin, a petroleum resin modified epoxy resin, and a rubber modified epoxy resin. Only one type of modified epoxy resin may be used alone or two or more types of the modified epoxy resin may be used together.

The petroleum resin modified epoxy resin can be obtained with a method of mixing an epoxy resin and a petroleum resin at a room temperature or a method of causing a mixture thereof to react under heating to thereby achieve ring-opening of a part of an epoxy group. A content of the petroleum resin in the petroleum resin modified epoxy resin is normally from 10 to 500 parts by mass with respect to 100 parts by mass of the epoxy resin.

A petroleum resin is exemplified by: an aromatic petroleum resin obtained by polymerizing a C9 fraction such as a styrene derivative, indene, or vinyl toluene in a heavy oil obtained as a by-product in petroleum naphtha cracking; an aliphatic petroleum resin obtained by polymerizing a C5 fraction such as 1,3-pentadiene or isoprene; a copolymerized petroleum resin obtained by copolymerizing the C9 fraction and the C5 fraction; an aliphatic petroleum resin obtained by partial cyclopolymerization of conjugate diene of the C5 fraction such as cyclopentadiene or 1,3-pentadiene; a resin obtained by hydrogenating an aromatic petroleum resin; and an alicyclic petroleum resin obtained by polymerizing dicyclopentadiene.

Though the vinyl based resin is not particularly limited so long as it is a resin obtained by polymerizing a vinyl based monomer such as vinyl chloride, vinyl isobutyl ether, vinyl acetate, vinyl propionate, vinyl pivalate, or propionic acid vinyl ester, a vinyl chloride based resin containing 50 mass % or more of vinyl chloride in monomer components is preferred. Among others, from a point of view of workability in painting, a vinyl chloride/vinyl isobutyl ether copolymer is preferred. A commercially available copolymer as such includes "Laloflex MP-45" (vinyl chloride/vinyl isobutyl ether copolymer (monomer ratio (mass ratio):approximately 75/25), manufactured by BASF SE).

A content of a binder resin in 100 mass % of components forming the coating film is normally from 10 to 80 mass % and preferably from 20 to 70 mass % (for example, from 20 to 60 mass %). The components forming the coating film mean all components other than a solvent contained in a colored paint. A content is preferably from 10 to 60 mass %. When the content is lower than 10 mass %, anticorrosion characteristics of an obtained coating film may be poor. When the content exceeds 80 mass %, a coating film may become too hard, resistance to cracking may lower, and adhesiveness to a surface of an object to be coated may be low.

Together with the binder resin, in particular, the epoxy resin and/or the modified epoxy resin, for example, an epoxy based reactive diluent such as versatic acid glycidyl ester, phenyl glycidyl ether, alkyl glycidyl ether (for example, n-butyl glycidyl ether), styrene oxide, allyl glycidyl ether, a glycerin epoxy resin, triphenyl phosphite, dicyclopentadiene diepoxide, vinyl cyclohexene diepoxide, or alkyl phenol glycidyl ether may be used.

(2) Color Pigment

Various conventionally known color pigments can be used as a color pigment to be contained in the colored paint, and a colored paint with various hues can be realized depending on selection of a color pigment. A type of the color pigment to be added to the colored paint (a hue of a colored anti-corrosive paint) can be selected in accordance with a surface of the object to be coated (a coated surface), and a type or combination of color pigments is preferably selected such that color difference $\Delta E3$ between a coating film having dry coating film thickness T and formed of a colored paint and the surface of the object to be coated is not smaller than 20. A hue of the coating film having dry coating film thickness T and formed of the colored paint is substantially the same as a hue of the colored paint itself if the colored paint is, for example, a normal solvent type paint free from segregation.

Specific examples of the color pigment are not particularly restricted, and for example, carbon black, titanium dioxide, zirconium oxide, basic lead sulfate, tin oxide, white lead, graphite, zinc sulfide, zinc oxide, chromium oxide, nickel titanium yellow, chromium titanium yellow, yellow iron oxide, red iron oxide, black iron oxide, chrome yellow, phthalocyanine blue, phthalocyanine green, ultramarine blue, quinacridone, and azo-based red and yellow pigments can be employed. These color pigments may be used alone or in combination of two or more types.

Among these, in view of high tinting strength, carbon black and titanium dioxide are preferably employed and the color pigment more preferably contains titanium dioxide. When only titanium dioxide is used as the color pigment, a coating film is in a light color. In order to avoid this, use as being combined with another color pigment is desirable.

Since the colored paint according to the present invention for forming a thick coating film in particular should have relatively low performance to hide an underlying substrate, a content of the color pigment is preferably relatively low. Specifically, a content of the color pigment is normally from 0.01 to 3 volume % and preferably from 0.1 to 2 volume % in the components forming the coating film. When a content of the color pigment is too low, power to hide the underlying substrate is too low, change in hue of a wet coating film being formed is also excessively less, and hence it is difficult to determine whether or not a defined film thickness has been reached. When a content of the color pigment is too high, power to hide the underlying substrate is too high, a coating film hides the surface of the object to be coated before a set value T for a target dry coating film thickness is reached, and hence it is similarly difficult to determine whether or not a defined film thickness has been reached.

(3) Scaly Pigment

The colored paint contains a scaly (flat) pigment (hereinafter also simply referred to as a "scaly pigment") having an average particle size from 10 to 300 μm, an average thickness from 2 to 50 μm, and an aspect ratio from 2 to 100, the aspect ratio being defined as the average particle size/the average thickness {condition (a)}. Definition of and a method of measurement of an average particle size, an average thickness, and an aspect ratio are described in the section of Examples.

Significance of containing a scaly pigment is as follows. Containing an extender pigment in a paint (anti-corrosive paint) for enhancing strength of a coating film or corrosion resistance in a case of an anti-corrosive paint is a commonly used technique, and a film thickness determination paint containing both of an extender pigment and a color pigment has also been known (PTDs 1 and 2). When a conventional film thickness determination paint is applied to a method of forming a thick coating film in a single-coating process as described above, it is difficult to achieve a sufficiently great color difference between a coating film having a thickness quite close to a target film thickness (set value T for a target dry coating film thickness) and a coating film which has reached a target film thickness, and it is not easy to determine whether or not a wet coating film has reached a target film thickness or still insufficient in film thickness.

Such a conventional problem will be described in further detail with reference to a graph of Comparative Example 5 shown in FIG. 1, in which the abscissa represents a dry film thickness (μm) and the ordinate represents color difference $\Delta E$ between a coating film having a dry film thickness and a coating film having set value T for a target dry coating film thickness. As illustrated, it can be seen that, with increase in dry film thickness, $\Delta E$ abruptly monotonously (exponentially so to speak) decreases and there is substantially no difference in $\Delta E$ in a foot region of the graph, that is, in a region at set value T for the dry coating film thickness (320 μm in FIG. 1) and in the vicinity of the set value before reaching the same (that is, a state that a color difference between the coating film having a thickness quite close to the target film thickness and the coating film which has reached the target film thickness is extremely small). This problem is more noticeable as a thickness of the coating film formed in a single-coating process is great, because, with increase in set value T for a dry coating film thickness, the foot region where substantially no difference in $\Delta E$ is produced extends over a wide area. Though the problem of the conventional film thickness determination paint and the method of forming a coating film with the use of the paint has been described with reference to Comparative Example 5, it is not admitted that the paint in Comparative Example 5 and the method of forming a coating film with the use of the paint belong to the conventional art.

Figure 1:
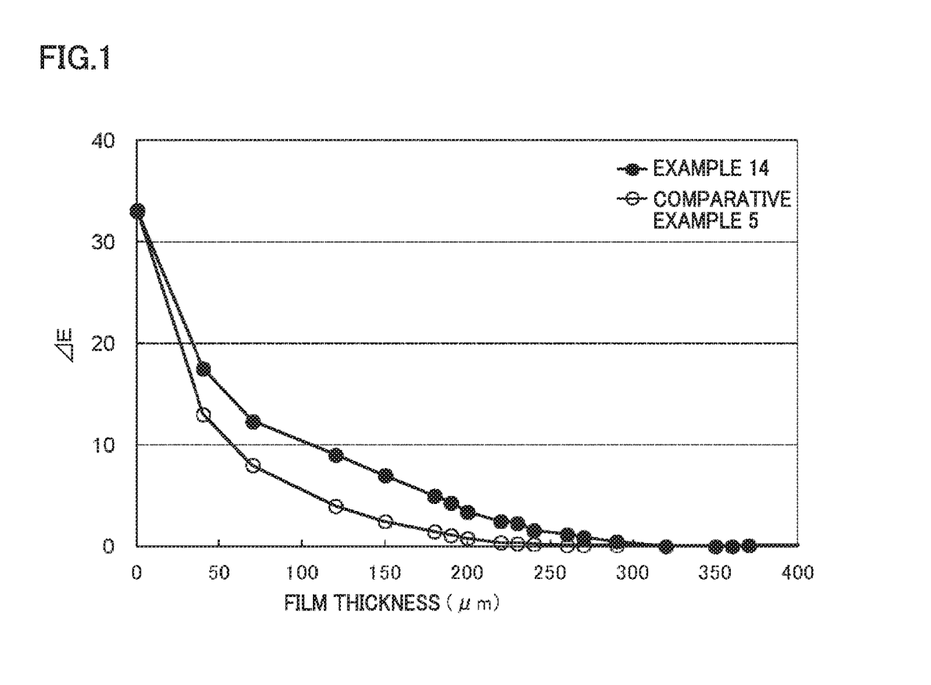
FIG. 1 is a diagram showing in a graph, relation between dry film thicknesses (μm) shown in Tables 3 to 5 and ΔE (Example 14 and Comparative Example 5).
Figure 2:
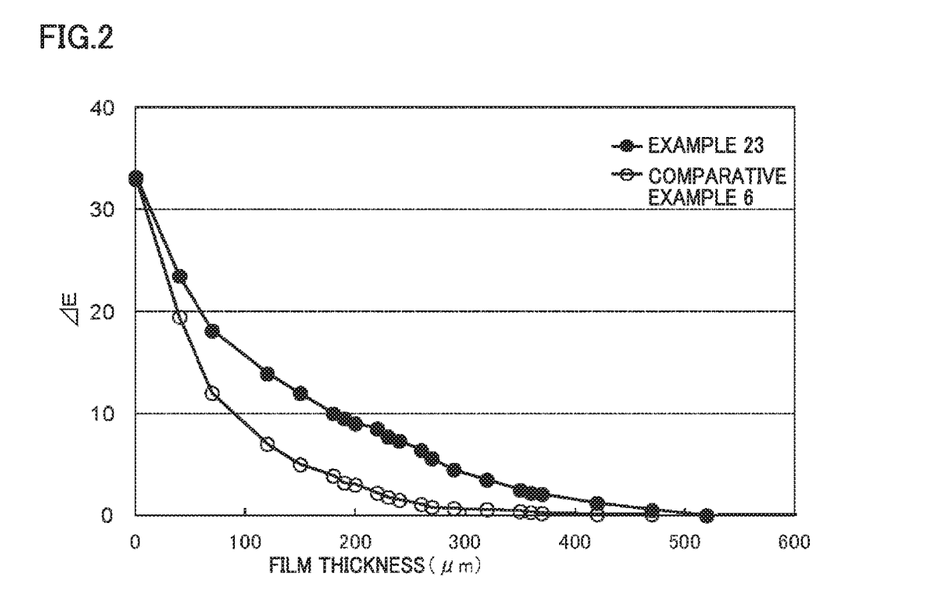
FIG. 2 is a diagram showing in a graph, relation between dry film thicknesses (μm) shown in Tables 3 to 5 and ΔE (Example 23 and Comparative Example 6).
Figure 3:
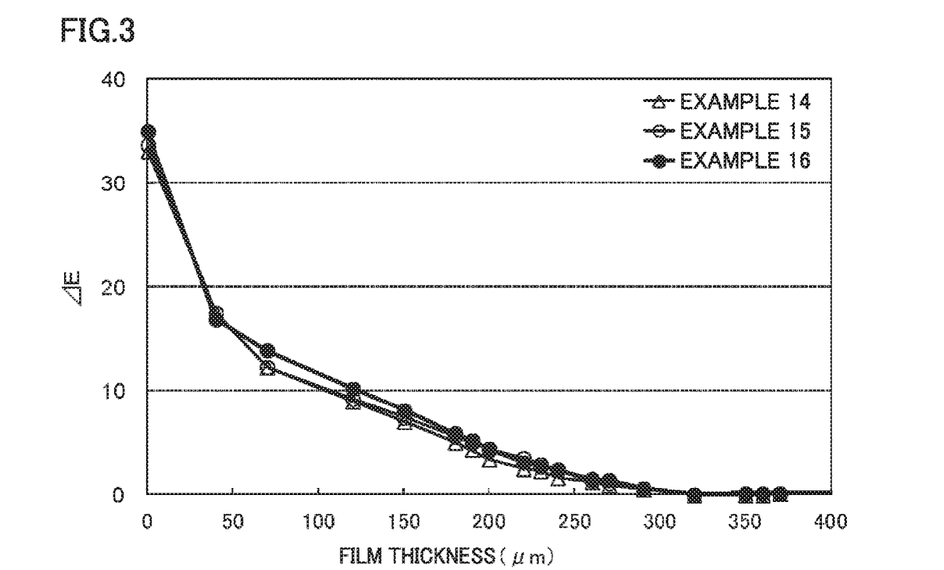
FIG. 3 is a diagram showing in a graph, relation between dry film thicknesses (μm) shown in Tables 3 to 5 and ΔE (Examples 14 to 16).
Figure 4:
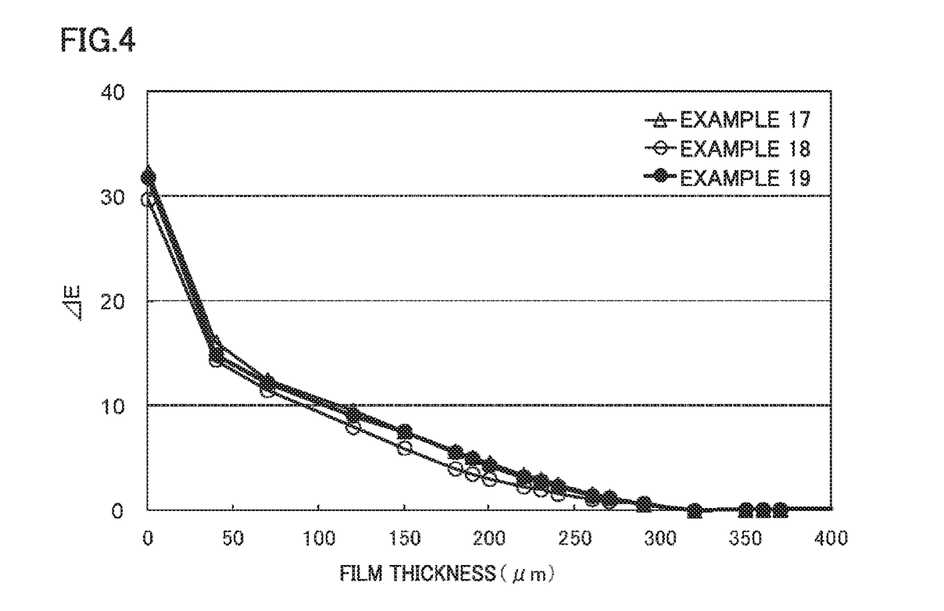
FIG. 4 is a diagram showing in a graph, relation between dry film thicknesses (μm) shown in Tables 3 to 5 and ΔE (Examples 17 to 19).
Figure 5:
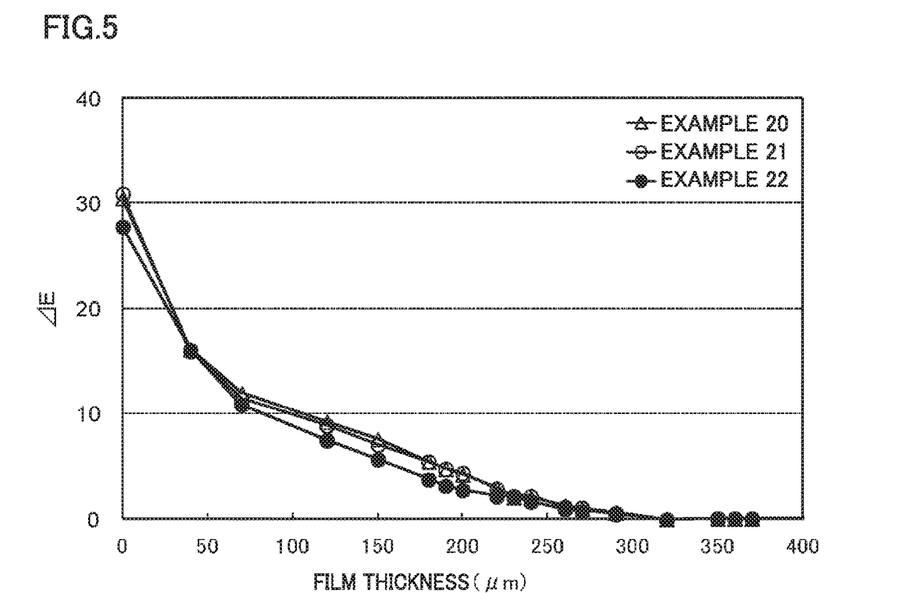
FIG. 5 is a diagram showing in a graph, relation between dry film thicknesses (μm) shown in Tables 3 to 5 and ΔE (Examples 20 to 22).
Figure 6:
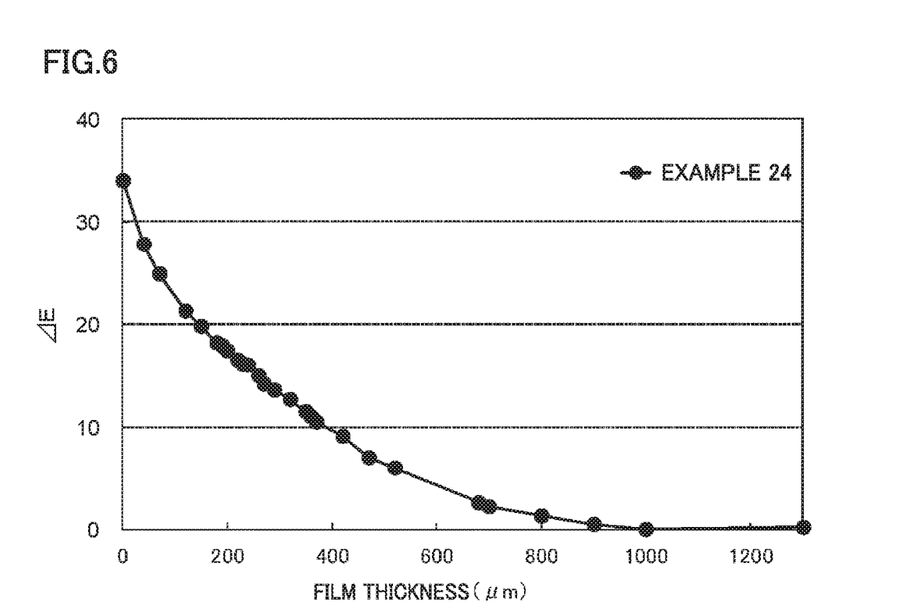
FIG. 6 is a diagram showing in a graph, relation between dry film thicknesses (μm) shown in Tables 3 to 5 and ΔE (Example 24).
Figure 7:
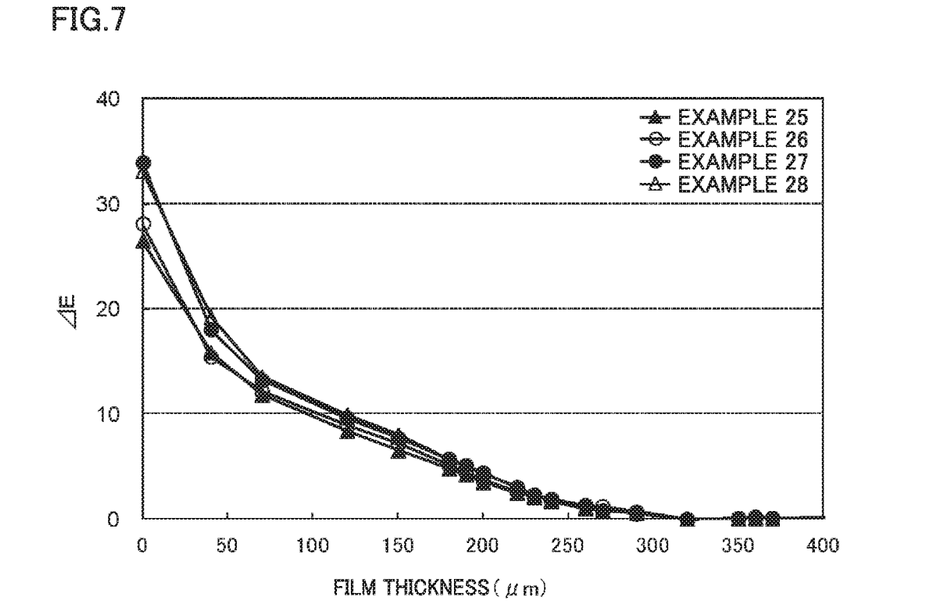
FIG. 7 is a diagram showing in a graph, relation between dry film thicknesses (μm) shown in Tables 3 to 5 and ΔE (Examples 25 to 28).
Figure 8:
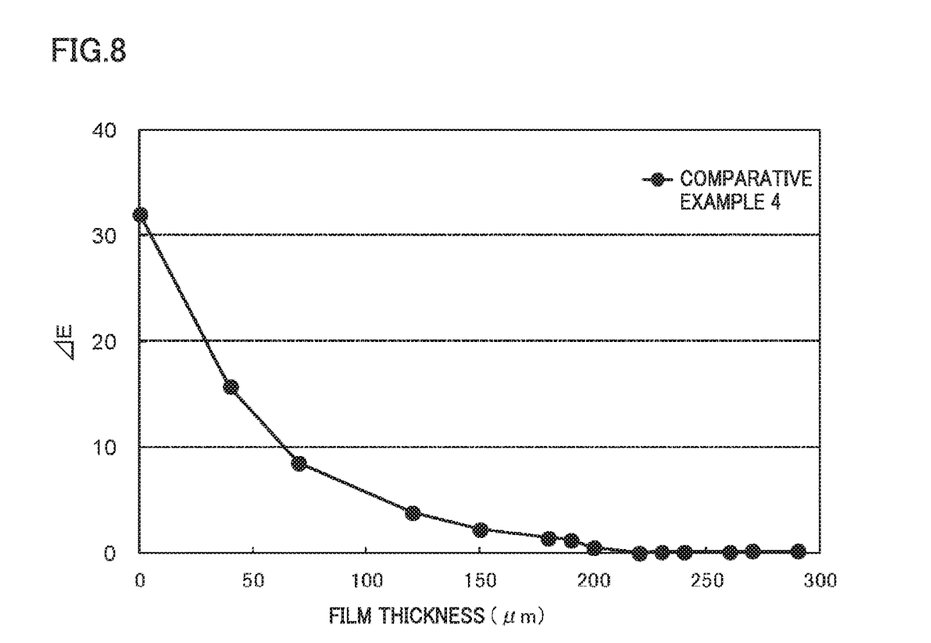
FIG. 8 is a diagram showing in a graph, relation between dry film thicknesses (μm) shown in Tables 3 to 5 and ΔE (Comparative Example 4).

In contrast, according to the colored paint containing the scaly pigment and the coating film formation method with the use of the same according to the present invention, for example, referring to the graph of Example 14 shown in FIG. 1, rather than exponential abrupt monotonous decrease, the graph of dry film thicknesses vs. ΔE has such a shape as slightly being raised toward greater ΔE between a dry film thickness of 0 μm and set value T for a dry coating film thickness, as compared with the shape of abrupt monotonous decrease in Comparative Example 5 With such a shape, a condition of "color difference ΔE1 between the coating film having dry coating film thickness T and the coating film having the dry coating film thickness of 0.7 T being not smaller than 2.0" {condition (d)} can be satisfied. Namely, a color difference between the coating film having a thickness quite close to the target film thickness (set value T for the target dry coating film thickness) and the coating film which has reached the target film thickness can sufficiently be large, and whether a wet coating film has reached the target film thickness or still insufficient in film thickness can readily be determined.

The reason why the shape of the graph as above is obtained is unclear. Basically, an extender pigment is a component which absorbs light and interferes passage of light. With increase in film thickness, a scaly pigment may tend to be oriented in a plane direction of a coating film (a direction of a longer axis of the scaly pigment is oriented in the plane direction of the coating film) and light may tend to accordingly pass through the scaly pigment. This may be a cause of the shape of the graph as above.

From a point of view of capability to satisfy condition (d) and physical properties of a paint and a coating film, the scaly pigment has an average particle size from 10 to 300 μm, preferably from 10 to 200 μm, and more preferably from 10 to 150 μm. When the average particle size is smaller than 10 μm, it is difficult to satisfy condition (d). In addition, when the average particle size is smaller than 10 μm, an amount of absorption of oil by the scaly pigment is large, viscosity of a paint is accordingly high, and workability in coating lowers. When the average particle size exceeds 300 μm as well, it is not easy to satisfy condition (d) and smoothness of the surface of the coating film is impaired.

From a point of view of capability to satisfy condition (d) and physical properties of a paint and a coating film, the scaly pigment has an aspect ratio from 2 to 100. An aspect ratio high to some extent tends to lead to further rise of the graph described above, and hence the aspect ratio is preferably not smaller than 3 and more preferably not smaller than 4. An aspect ratio smaller than 2 is disadvantageous in satisfying condition (d). When an aspect ratio is excessively high, an effect of reinforcement of the coating film by the scaly pigment is insufficient and strength of the coating film or corrosion resistance in a case of an anti-corrosive paint lowers. Therefore, the aspect ratio is preferably not greater than 20.

The scaly pigment has an average thickness from 2 to 50 μm. A preferred range of the average thickness can be a range derived from the preferred range of the average particle size and the preferred range of the aspect ratio, and can be a range, for example, from 2 to 30 μm (for example, from 2 to 20 μm).

The scaly pigment has an index of refraction preferably not higher than 1.8, more preferably not higher than 1.7, and further preferably not higher than 1.6. Condition (d) can more easily be satisfied by increasing an amount of passage of light by setting an index of refraction to be low so as to suppress reflection of light at an interface between the binder resin and the scaly pigment in the coating film. A method of measuring an index of refraction is as described in the section of Examples.

The scaly pigment can be an extender pigment, and it can specifically be talc, mica, clay, glass flake, or aluminum hydroxide. Preferably, talc, mica, clay, or glass flake is employed, and more preferably, talc, mica, or glass flake is employed. The colored paint can contain one type or two or more types of scaly pigment.

The colored paint can contain an extender pigment other than the scaly pigment. Other extender pigments may be such a flat extender pigment that any one or more of the average particle size, the average thickness, and the aspect ratio do not satisfy the prescribed range above or a particulate extender pigment having an aspect ratio of 1 or approximately 1. Other extender pigments may be made of a material the same as or different from that for the scaly pigment, and specific examples thereof include calcium carbonate, magnesium carbonate, barium sulfate, silica, alumina, bentonite, silicic acid, silicate, aluminum oxide hydrate, and calcium sulfate, in addition to those described for the scaly pigment. The colored paint can contain one type or two or more types of other extender pigments.

A content of the scaly pigment is from 5 to 45 volume % {condition (b)} and preferably from 10 to 40 volume % (for example, from 15 to 35 volume %) in the components forming the coating film. When the content of the scaly pigment is lower than 5 volume %, it is difficult to obtain the effect described above by blending the scaly pigment. When other extender pigments are not used together, an effect of reinforcement of the coating film is insufficient and strength of a coating film or corrosion resistance in a case of an anti-corrosive paint is insufficient. When the content exceeds 45 volume %, film formation performance lowers.

When the scaly pigment and other extender pigments are used together, a total content thereof is preferably not higher than 45 volume % in the components forming the coating film. When the scaly pigment and other extender pigments are used together, from a point of view of capability to satisfy condition (d), a content of the scaly pigment in the total content is preferably not lower than 10 volume %, more preferably not lower than 20 volume %, and further preferably not lower than 30 volume %.

(4) Curing Agent

The colored paint can further contain a curing agent for curing the binder resin. A conventionally known curing agent can be employed as the curing agent, and an amine based, polyamide based, or polyisocyanate compound based curing agent can suitably be used as the curing agent for an epoxy resin or a modified epoxy resin. Only one type of a curing agent may be used alone or two or more types of curing agent may be used together.

Specific examples of the amine based curing agent include: chain aliphatic polyamine such as diethylenetriamine, triethylenetetramine, and (ethylamino)propyl amine; cyclic aliphatic polyamine; an adduct of aliphatic polyamine; ketimine; modified aliphatic polyamine; polyamide amine; aromatic amine or a modified product thereof, and aromatic polyamine such as diamino diphenyl methane or a modified product thereof.

Specific examples of the polyamide based curing agent include aliphatic polyamide obtained by polycondensation of polycarboxylic acid and polyamine or aromatic polyamide obtained by introducing an aromatic ring in the former, an adduct of aliphatic polyamide, and an adduct of aromatic polyamide.

Specific examples of the polyisocyanate compound based curing agent include: aliphatic polyisocyanate such as hexamethylene diisocyanate (HMDI); alicyclic polyisocyanate such as isophorone diisocyanate (IPDI); aromatic polyisocyanate such as diphenylmethane-4,4'-diisocyanate (MDI); a hydrogenated product of aromatic polyisocyanate such as hydrogenated MDI; and block isocyanate in which a functional group of such a polyisocyanate compound is partially or completely blocked.

From a point of view of suppression of absorption of light by the curing agent and ease in satisfying condition (d), the curing agent has a Gardner color scale preferably not greater than 18 and more preferably not greater than 16. A method of measuring a Gardner color scale is as described in the section of Examples.

A content of the curing agent may be a normal amount, and it is, for example, approximately from 5 to 200 parts by mass and preferably approximately from 20 to 100 parts by mass per 100 parts by mass of binder resin. When a content of the curing agent is lower than 5 parts by mass in a system requiring a curing agent, a crosslinking density of a coating film is insufficient, and hardness, weather resistance, corrosion resistance, heat resistance, and moisture resistance of the coating film tend to be insufficient. When a content of the curing agent exceeds 200 parts by mass, the coating film tends to be brittle.

(5) Other Blending Components

The colored paint can contain one type or two or more types of blending components other than the above. Specific examples of other blending components include a solvent, a rustproof pigment, an anti-sagging agent, a defoaming agent, an ultraviolet absorber, a surface control agent, a viscosity control agent, a leveling agent, a pigment dispersant, and a plasticizer. A content of other blending components is preferably set to such an extent that a sharp hue of the color pigment or the color pigment's performance of hiding an underlying substrate is not interfered and a film thickness determination function of the colored paint is not lowered.

An organic solvent can suitably be used as the solvent, and examples of the solvent include: aromatic hydrocarbon such as toluene, xylene, and ethylbenzene; aliphatic or alicyclic hydrocarbon such as cyclopentane, octane, heptane, cyclohexane, and white spirit; petroleum fractions which are mainly composed of aliphatic hydrocarbon and have a small amount of aromatic hydrocarbon and can exhibit a range of various boiling points; ethers such as dioxane, tetrahydrofuran, ethyleneglycol monomethyl ether, ethyleneglycol monoethyl ether, ethyleneglycol monobutyl ether, ethyleneglycol dibutyl ether, diethyleneglycol monomethyl ether, and diethyleneglycol monoethyl ether; esters such as butyl acetate, propyl acetate, benzyl acetate, ethyleneglycol diacetate, 2-ethoxyethyl acetate, ethyleneglycol monomethyl ether acetate, and ethyleneglycol monoethyl ether acetate; ketones such as ethyl isobutyl ketone and methyl isobutyl ketone; and alcohols such as n-butanol, i-butanol, t-butanol, n-propanol, i-propanol, and benzyl alcohol. These solvents may be used alone or in combination of two or more types.

Specific examples of the rustproof pigment include such a metal compound as calcium sulfate hemihydrate, aluminum tripolyphosphate, calcium phosphite, zinc phosphate, lead tetroxide, basic lead sulfate, lead suboxide, lead cyanamide, zinc calcium cyanamide, zinc molybdate, aluminum molybdate, basic lead chromate, zinc chromate, strontium chromate, and barium chromate. Preferably, a white rustproof pigment is employed.

(6) Formulation of Colored Paint

A colored paint can be formulated by mixing a binder resin, a color pigment, and a scaly pigment as well as blending components other than the former which are blended as necessary in a mixer such as a ball mill, a pebble mill, a roll mill, a sand grind mill, or a high-speed disper. When a curing agent is used, the colored paint may be a two-pack type of a main agent and a curing agent.

(7) Film Thickness Determination Function of Colored Paint

The colored paint according to the present invention is a paint excellent in film thickness determination function which satisfies at least conditions (c) and (d) below and preferably further satisfies condition (e) below, and is suitably an anti-corrosive paint. "Dry coating film thickness T" in the conditions below refers to a thickness selected from a range not smaller than 300 μm as will be described later.

(c) A coating film having set dry coating film thickness T and formed of the colored paint hides a surface of an object to be coated.

(d) Color difference $\Delta E1$ between the coating film having set dry coating film thickness T and formed of the colored paint and a coating film having dry coating film thickness of 0.7 T and formed of the colored paint is not smaller than 2.0.

(e) Color difference $\Delta E2$ between the coating film having set dry coating film thickness T and formed of the colored paint and a coating film having a dry coating film thickness of 1.3 T and formed of the colored paint is smaller than 1.

Color differences $\Delta E1$ and $\Delta E2$ as well as $\Delta E3$ which will be described later can be determined with a generally approved method, by using such a color difference meter (a colorimeter) as a tristimulus colorimeter SM color meter (model number SM-T45 manufactured by Suga Test Instruments Co., Ltd). Color differences $\Delta E1$, $\Delta E2$, and $\Delta E3$ are each expressed by an absolute value.

The condition (c) above defines performance of a coating film formed of the colored paint having dry coating film thickness T to hide a surface of an object to be coated (the coating film herein refers to a dry coating film, however, a wet coating film and a dry coating film are substantially the same in performance to hide an underlying substrate). As the surface of the object to be coated is coated with the colored paint and as a thickness of the coating film increases, a degree of "lack of hiding" of the surface of the object to be coated becomes lower. It is determined that the coating film formed of the colored paint hides the surface of the object to be coated when a hue of the surface of the object to be coated disappears and the hue of a coated surface becomes the same as the hue of the coating film formed of the colored paint. The colored paint according to the present invention can achieve such hiding of the surface of the object to be coated when a dry coating film not smaller than target dry coating film thickness T is formed.

Hiding performance of the dry coating film formed of the colored paint can be evaluated also based on a contrast ratio in conformity with JIS K 5600-4-1: 1999. In order to satisfy condition (c), the coating film having dry coating film thickness T and formed of the colored paint has a contrast ratio preferably from 0.90 to 0.98 and more preferably from 0.92 to 0.98 (for example, from 0.92 to 0.96).

Condition (d) defines color difference $\Delta E1$ between a case that a coating film formed of the colored paint has dry coating film thickness T set as the target and a case that the coating film has dry coating film thickness of 0.7 T. The coating film having the dry coating film thickness of 0.7 T is the coating film before completion of coating. Color difference $\Delta E1$ as great as 2.0 or more means that dependency on a film thickness of a hue of the coating film immediately before completion of coating {from just being short of dry coating film thickness T (0.7 T) to dry coating film thickness T} is great. Thus, since a color difference between the coating film having a thickness quite close to dry coating film thickness T and the coating film which has reached dry coating film thickness T can sufficiently be great, whether a wet coating film has reached the target film thickness or still insufficient in film thickness can readily be determined, the dry coating film having dry coating film thickness T can extremely accurately be formed, and even slight insufficiency in film thickness can also be eliminated.

Color difference $\Delta E1$ is preferably not smaller than 2.1, more preferably not smaller than 2.5, and further preferably not smaller than 3.0. When color difference $\Delta E1$ is too great, however, mottle is likely even with a slight difference in film thickness. Therefore, color difference $\Delta E$ is preferably not greater than 10 and more preferably not greater than 5. As described above, color difference $\Delta E1$ "not smaller than 2.0" in forming a thick coating film not smaller than 300 µm can be achieved mainly by applying a scaly pigment.

In order to more readily determine whether a wet coating film has reached the target film thickness or still insufficient in film thickness based on sufficient increase in color difference between the coating film having a thickness quite close to dry coating film thickness T and the coating film which has reached dry coating film thickness T, a color difference $\Delta E1'$ between the coating film having set dry coating film thickness T and formed of the colored paint and a coating film having a dry coating film thickness of 0.8 T and formed of the colored paint is preferably not smaller than 1.0, more preferably not smaller than 1.1, and further preferably not smaller than 1.2 (for example, not smaller than 1.5). For similar reasons, a color difference $\Delta E1''$ between the coating film having set dry coating film thickness T and formed of the colored paint and a coating film having a dry coating film thickness of 0.9 T and formed of the colored paint is preferably not smaller than 0.5, more preferably not smaller than 0.6, and further preferably not smaller than 0.7.

Condition (e) defines color difference $\Delta E2$ between a case that a dry coating film formed of the colored paint has dry coating film thickness T set as the target and a case that the coating film has dry coating film thickness of 1.3 T. The coating film having the dry coating film thickness of 1.3 T is a coating film after (or immediately after) completion of coating. Color difference $\Delta E2$ not smaller than 1 leads to a greater color difference between the coating film having dry coating film thickness T and a coating film exceeding dry coating film thickness T, which leads to mottle. Color difference $\Delta E2$ is preferably not greater than 0.5 and more preferably not greater than 0.4 (for example, not greater than 0.2).

As color difference $\Delta E3$ between the coating film having set dry coating film thickness T and formed of the colored paint and the surface of the object to be coated is greater, it is easier to visually check how a color difference from the object to be coated changes as a thickness of the coating film being painted comes closer to the target film thickness, and hence it becomes easier to determine whether a wet coating film has reached the target film thickness or still insufficient in film thickness. Therefore, color difference $\Delta E3$ is preferably not smaller than 20 {condition (f)}, more preferably not smaller than 25, and further preferably not smaller than 30. When color difference $\Delta E3$ is too small, it tends to be difficult to check whether or not the coating film hides the surface of the object to be coated.

The colored paint satisfying the conditions above can be obtained by selecting a type (a hue) of a color pigment and adjustment of a content thereof on the premise that a prescribed amount of scaly pigment is contained. A set value for dry coating film thickness T of the colored paint can be adjusted in accordance with a content of the color pigment. Namely, basically, the set value for dry coating film thickness T of the colored paint can be greater by decreasing a content of the color pigment. In other words, since the set value for dry coating film thickness T is determined by characteristics of a coating film such as corrosion resistance required of the coating film or a type of an object to be coated, a content of the color pigment is adjusted so as to adapt to the set value for dry coating film thickness T.

<Coating Film Formation Method>

As described above, the coating film formation method according to the present invention is a method for forming a dry coating film on a surface of an object to be coated, and includes the steps of setting dry coating film thickness T (the dry coating film thickness setting step), formulating or preparing a colored paint containing at least a binder resin and a color pigment and satisfying conditions (a) to (d) described above (preferably additionally conditions (e) and (f) (the colored paint preparation step), coating the surface of the object to be coated with the colored paint until the surface is hidden by a coating film formed of the colored paint (the coating step), and obtaining a dry coating film by drying the coating film (a wet coating film) obtained in the coating step (the drying step).

Though the coating film formation method according to the present invention defines a coating film formation method in a single-coating process as can be understood from each step included in the method, every coating film formation method is encompassed in the present invention so long as this coating film formation method in a single-coating process is included. For example, a method of obtaining a dry coating film having an ensured desired film thickness in a multiple-coating process is also encompassed in the present invention, with the coating film formation method in the single-coating process according to the present invention being included. Each step will be described below in detail.

(Dry Coating Film Thickness Setting Step)

The present step is the step of setting dry coating film thickness T representing a target film thickness of a dry coating film formed in a single-coating process. In the present invention, dry coating film thickness T is selected from a range not smaller than 300 µm. The problem to be solved by the present invention is concerned and the method according to the present invention serves as effective means for solving this problem only when dry coating film thickness T is approximately 300 µm or greater. In order to formulate or prepare a prescribed colored paint in the colored paint preparation step, dry coating film thickness T should be set in advance and hence the present step is performed before the colored paint preparation step.

Dry coating film thickness T may be a film thickness itself of a dry coating film which is to finally be formed on a surface of an object to be coated or a film thickness of a dry coating film in an intermediate stage of formation in forming the dry coating film. The former example corresponds to a case of formation of a final dry coating film in a single-coating process on a surface of an object to be coated and the latter example corresponds to a case of formation of a final dry coating film in a multiple-paint process. In a specific example of the latter, for example, a dry coating film having a thickness of 600 µm which is a final target is formed by forming a dry coating film having a thickness of 300 µm in a single-coating process and thereafter further forming thereon a dry coating film having a thickness of 300 µm. A film thickness of a dry coating film to finally be formed on the surface of the object to be coated is normally a film thickness which allows sufficient achievement of desired characteristics to be provided to a surface of an object to be coated through formation of a coating film (for example, in a case of an anti-corrosive coating film, a film thickness allowing achievement of sufficient corrosion resistance).

(Colored Paint Preparation Step)

The present step is the step of formulating or preparing a colored paint according to the present invention, which contains at least a binder resin and a color pigment and satisfies conditions (a) to (d) {preferably additionally conditions (e) and (f)}. Since details of the colored paint including a formulation method thereof are as described above, description thereof is not provided here.

(Coating Step)

The present step is the step of coating a surface of an object to be coated with a colored paint until the surface is hidden by a coating film formed of the colored paint. In this step, the surface of the object to be coated is coated with the colored paint while change in color difference between a coating being formed (a wet coating film) and the surface of the object to be coated is observed. "Change in color difference between a coating being formed (a wet coating film) and the surface of the object to be coated being observed" typically means observation as to whether or not "lack of hiding" of the surface of the object to be coated is seen on a coated surface, that is, to which extent the coating being formed (wet coating film) hides the surface of the object to be coated. More specifically, while the surface of the object to be coated is coated with the colored paint, a thickness of the coating film is small in an early stage of coating and hence a hue of the wet coating film considerably reflects a hue of an underlying surface of the object to be coated (that is, "lack of hiding" is significant). Thus, change in hue of the coating being formed (wet coating film) with respect to the hue of the surface of the object to be coated is visually observed. This "lack of hiding" is lessened with increase in thickness of the coating film, and a time point when the hue of the surface of the object to be coated is no longer reflected on the hue of the wet coating film, that is, the time point when the wet coating film hides the surface of the object to be coated, is reached. Since performance of the wet coating film to hide the underlying substrate is substantially the same as performance of the dry coating film to hide the underlying substrate, a thickness of the wet coating film at this time point (a thickness of the wet coating film at the time when the surface of the object to be coated is hidden) defines the film thickness corresponding to target dry coating film thickness T.

In the coating method above, whether or not the wet coating film has hidden the surface of the object to be coated can be checked as follows. For example, a color chart including a dry coating film having target dry coating film thickness T is prepared in advance, and it can be determined that the wet coating film has hidden the surface of the object to be coated at the time point when the hue of this color chart and the hue of the wet coating film match with each other. When a region where a coating film has already been formed to a target film thickness is present in the vicinity of the surface of the object to be coated which is being coated, it can be determined that the wet coating film has hidden the surface of the object to be coated at the time point when the hue of the coating film in this region and the hue of the wet coating film match with each other. Since the hue of the dry coating film having target dry coating film thickness T and of the wet coating film corresponding thereto is typically the same as the hue of the colored paint itself, it can also be determined that the wet coating film has hidden the surface of the object to be coated at the time point when the hue of the wet coating film matches with the hue of the colored paint itself.

A method of coating with a colored paint is not particularly limited, and conventionally known methods such as immersion, spraying, brush painting, roller painting, and electrostatic painting can be employed.

An object to be coated is not particularly restricted, and examples thereof include various structures, in particular underwater structures and marine vessels, made, for example, of: steel materials such as a non-treated steel material, a blasted steel material, an acid-treated steel material, a zinc-plated steel material, and a stainless steel material, nonferrous metal materials such as an aluminum (alloy) material and a copper (alloy) material; concrete; plastic; and the like. These steel materials and nonferrous metal materials may include a weld line. Specific examples of the underwater structure include harbor facilities, an intake structure of a power plant, a pipe such as an aqueduct for cooling, a bridge, a buoyage, industrial water facilities, and a sea bottom base.

A surface of an object to be coated, which is to be coated with the colored paint, may be pre-treated as necessary or may have an undercoat layer (coating film). Examples of such a coating film include a shopprimer layer formed of a conventionally known rustproof paint composition and another anti-corrosive coating film in a case that a coating film formed of the colored paint according to the present invention is an anti-corrosive coating film. Description is given here by again citing the specific example above. Another anti-corrosive coating film can be a coating film in a first layer, for example, in a case that an anti-corrosive coating film having a thickness of 600 μm which is a final target is formed by forming a dry coating film having a thickness of 300 μm in a single-coating process and thereafter further forming a dry coating film having a thickness of 300 μm. When an undercoat layer is formed on the surface of the object to be coated, the "surface of the object to be coated" in conditions (c) and (f) means a surface of an undercoat coating film.

Another anti-corrosive coating film may be formed in accordance with the method according to the present invention. In forming an anti-corrosive coating film further on such a colored anti-corrosive coating film in accordance with the method according to the present invention, in order to satisfy condition (f), a colored paint for forming an underlying anti-corrosive coating film and a colored paint for an anti-corrosive coating film formed thereon are preferably different from each other in color, and a color difference between two paints is preferably not smaller than 20.

(Drying Step)

The present step is the step of obtaining a dry coating film by drying the coating film (wet coating film) obtained in the coating step. A conventionally known method can be used for drying (and curing) the wet coating film, and drying may be carried out at a room temperature or a temperature equal to or lower than that or under heating.

(Other Steps)

A topcoat coating film may be formed on the obtained dry coating film by coating the dry coating film with a topcoat paint. A topcoat coating film may be formed by forming a binder coat on the obtained dry coating film and coating the binder coat with a topcoat paint. One type or two or more types selected from an epoxy resin based paint, a chlorinated rubber resin based paint, a vinyl chloride resin based paint, an alkyd resin based paint, a silicon alkyd resin based paint, an acrylic resin based paint, a urethane resin based paint, a fluorine resin based paint, a polyester resin based paint, an epoxy acrylic resin based paint, and a polysiloxane resin based paint can be employed as a topcoat paint. The topcoat paint may be an antifouling paint used for underwater structures and marine vessels. Examples of the antifouling paint include an antifouling paint containing an acrylic resin having an hydrolyzable group in a side chain as a binder resin. The hydrolyzable group can be, for example, a metal ester group containing a metal atom such as divalent Cu or Zn or a trialkylsilyl ester group.

According to the coating film formation method with the use of the colored paint according to the present invention, whether or not a coating being formed has reached a prescribed film thickness can readily be determined and therefore a uniform coating film having a prescribed dry film thickness can accurately be formed. Thus, insufficiency in film thickness which has conventionally often occurred can effectively be prevented. Since an excessive film thickness can also be prevented, a paint can also be saved.

According to the coating film formation method with the use of the colored paint according to the present invention, a troublesome operation for checking whether or not a prescribed film thickness has been reached by sequentially measuring a thickness of a coating film can be avoided. Therefore, a coating work can significantly be made efficient and load imposed on a coating worker can significantly be lessened.

The coating film formation method with the use of the colored paint according to the present invention can be applied to painting (for example, anti-corrosive painting) of various structures (in particular, marine vessels or underwater structures). According to the method of the present invention, a uniform coating film having a prescribed dry film thickness can accurately be formed in a simplified manner on a structure or a part thereof which is difficult to coat, for example, when an outer surface of a large structure such as a marine vessel is subjected to anti-corrosive painting.

EXAMPLES

Though the present invention will be described hereinafter further specifically with reference to Examples and Comparative Examples, the present invention is not limited by these examples.

Examples 1 to 13 and Comparative Examples 1 to 3: Formulation of Colored Paint

A two-pack colored paint in a yellow-based color was formulated in accordance with a blend composition shown in Tables 1 and 2. A unit of an amount of blend in fields of "main agent" and "curing agent" in Tables 1 and 2 is represented as "parts by mass." The main agent was formulated by introducing all components forming the main agent in a paint shaker together with glass beads and sufficiently mixing and dispersing the components.

Tables 1 and 2 also show representation in volume %, of an amount of blended color pigment, scaly pigment, and extender pigment (other extender pigments) (volume % in the components forming the coating film). The components forming the coating film mean all components other than a solvent contained in the colored paint. Set value T for a target dry coating film thickness of each colored paint and a contrast ratio of the dry coating film of each colored paint having dry coating film thickness T (denoted as a "contrast ratio at dry coating film thickness T" in Tables 1 and 2) are also shown

TABLE 1

|  |  |  | Example | | | | | | | | | |
| --- | --- | --- | --- | --- | --- | --- | --- | --- | --- | --- | --- |
|  |  |  | 1 | 2 | 3 | 4 | 5 | 6 | 7 | 8 | 9 |
| Main Agent | Resin | Epoxy Resin 1 | 26.0 | 26.0 | 26.0 | 26.0 | 26.0 | 26.0 | 26.0 | 26.0 | 26.0 |
|  |  | Epoxy Resin 2 |  |  |  |  |  |  |  |  |  |
|  |  | Epoxy Resin 3 |  |  |  |  |  |  |  |  |  |
|  |  | Thermoplastic Resin | 10.0 | 10.0 | 10.0 | 10.0 | 10.0 | 10.0 | 10.0 | 10.0 | 10.0 |
|  |  | Reactive Diluent |  |  |  |  |  |  |  |  |  |
|  | Color | Color Pigment 1 | 0.68 | 0.80 | 0.68 | 0.68 | 0.68 | 0.90 | 0.77 | 0.70 | 0.74 |
|  | Pigment | Color Pigment 2 | 0.64 | 0.64 | 0.64 | 0.64 | 0.64 | 0.72 | 0.61 | 0.64 | 0.64 |
|  | Scaly | Glass Flake |  | 32.9 |  |  |  | 58.0 | 23.0 | 5.0 | 11.8 |
|  | Pigment | Mica 1 |  |  | 35.4 |  |  |  |  |  |  |
|  |  | Mica 2 |  |  |  | 36.8 |  |  |  |  |  |
|  |  | Talc 1 | 35.4 |  |  |  |  |  |  | 30.0 |  |
|  |  | Talc 2 |  |  |  |  | 35.5 |  |  |  |  |
|  | Extender | Talc 3 |  |  |  |  |  |  |  |  | 22.7 |
|  | Pigment |  |  |  |  |  |  |  |  |  |  |
|  | Solvent | Xylene | 2.0 | 2.0 | 2.0 | 2.0 | 2.0 | 5.0 | 2.0 | 2.0 | 2.0 |
|  |  | Isobutanol | 1.0 | 1.0 | 1.0 | 1.0 | 1.0 | 5.0 | 1.0 | 1.0 | 1.0 |
|  |  | Methyl Isobutyl Ketone | 2.0 | 2.0 | 2.0 | 2.0 | 2.0 | 5.0 | 2.0 | 2.0 | 2.0 |
|  |  | Benzyl Alcohol |  |  |  |  |  |  |  |  |  |
| Curing Agent |  | Curing Agent 1 | 13.0 | 13.0 | 13.0 | 13.0 | 13.0 | 13.0 | 13.0 | 13.0 | 13.0 |
|  |  | Curing Agent 2 |  |  |  |  |  |  |  |  |  |
| Amount of Blended Color Pigment (Volume %) | | | 0.68 | 0.74 | 0.68 | 0.68 | 0.68 | 0.69 | 0.78 | 0.68 | 0.68 |
| Amount of Blended Scaly Pigment (Volume %) | | | 27.8 | 27.8 | 27.8 | 27.8 | 27.8 | 40.4 | 21.2 | 27.8 | 10.0 |
| Amount of Blended Extender Pigment (Volume %) | | | 0.0 | 0.0 | 0.0 | 0.0 | 0.0 | 0.0 | 0.0 | 0.0 | 17.8 |
| Scaly Pigment + Extender Pigment (Volume %) | | | 27.8 | 27.8 | 27.8 | 27.8 | 27.8 | 40.4 | 21.2 | 27.8 | 27.8 |
| Set Value T for Dry Coating Film Thickness (µm) | | | 320 | 320 | 320 | 320 | 320 | 320 | 320 | 320 | 320 |
| Contrast Ratio at Dry Coating Film Thickness T | | | 0.94 | 0.94 | 0.94 | 0.94 | 0.95 | 0.94 | 0.95 | 0.95 | 0.95 |

TABLE 2

|  |  |  | Example | | | | Comparative Example | | |
| --- | --- | --- | --- | --- | --- | --- | --- | --- | --- |
|  |  |  | 10 | 11 | 12 | 13 | 1 | 2 | 3 |
| Main Agent | Resin | Epoxy Resin 1 | 26.0 | 26.0 |  |  | 26.0 | 26.0 | 26.0 |
|  |  | Epoxy Resin 2 |  |  | 2.0 |  |  |  |  |
|  |  | Epoxy Resin 3 |  |  | 24.0 | 24.0 |  |  |  |
|  |  | Thermoplastic Resin | 10.0 | 10.0 |  | 10.0 | 10.0 | 10.0 | 10.0 |
|  |  | Reactive Diluent |  |  | 9.0 |  |  |  |  |
|  | Color Pigment | Color Pigment 1 | 0.40 | 0.20 | 1.06 | 1.04 | 1.19 | 0.68 | 0.40 |
|  |  | Color Pigment 2 | 0.35 | 0.20 | 0.85 | 0.85 | 1.11 | 0.64 | 0.35 |
|  | Scaly Pigment | Glass Flake |  |  | 32.7 | 35.3 | 34.7 |  |  |
|  |  | Mica 1 |  |  |  |  |  |  |  |
|  |  | Mica 2 |  |  |  |  |  |  |  |
|  |  | Talc 1 | 35.4 |  |  |  |  |  |  |
|  |  | Talc 2 |  |  |  |  |  |  |  |
|  | Extender Pigment | Talc 3 |  |  |  |  | 35.8 | 35.4 | 35.3 |
|  | Solvent | Xylene | 2.0 | 2.0 |  |  | 2.0 | 2.0 | 2.0 |
|  |  | Isobutanol | 1.0 | 1.0 |  |  | 1.0 | 1.0 | 1.0 |
|  |  | Methyl Isobutyl Ketone | 2.0 | 2.0 |  |  | 2.0 | 2.0 | 2.0 |
|  |  | Benzyl Alcohol |  |  | 2.0 | 2.0 |  |  |  |
| Curing Agent |  | Curing Agent 1 | 13.0 | 13.0 |  |  | 13.0 | 13.0 | 13.0 |
|  |  | Curing Agent 2 |  |  | 15.0 | 15.0 |  |  |  |
| Amount of Blended Color Pigment (Volume %) | | | 0.39 | 0.21 | 0.77 | 0.77 | 1.18 | 0.68 | 0.39 |
| Amount of Blended Scaly Pigment (Volume %) | | | 27.8 | 27.8 | 23.3 | 23.3 | 0.0 | 0.0 | 0.0 |
| Amount of Blended Extender Pigment (Volume %) | | | 0.0 | 0.0 | 0.0 | 0.0 | 27.8 | 27.8 | 27.8 |
| Scaly Pigment + Extender Pigment (Volume %) | | | 27.8 | 27.8 | 23.3 | 23.3 | 27.8 | 27.8 | 27.8 |
| Set Value T for Dry Coating Film Thickness (μm) | | | 520 | 1000 | 320 | 320 | 220 | 320 | 520 |
| Contrast Ratio at Dry Coating Film Thickness T | | | 0.95 | 0.95 | 0.94 | 0.94 | 0.94 | 0.94 | 0.94 |

Abbreviations shown in Tables 1 and 2 are as follows.

{a} Epoxy resin 1: "Epotohto YD134X80" manufactured by Tohto Kasei Co., Ltd. (a bisphenol A type epoxy resin, a non-volatile content of 80 mass % and a specific gravity of the non-volatile content of 1.2)

{b} Epoxy resin 2: "Epiclon 830" manufactured by DIC Corporation (a bisphenol F type epoxy resin, a non-volatile content of 100 mass % and a specific gravity of 1.1)

{c} Epoxy resin 3: "DER 331J" manufactured by the Dow Chemical Company (a bisphenol A type epoxy resin, a non-volatile content of 100 mass % and a specific gravity of 1.1)

{d} Thermoplastic resin: "HIRENOL PL-1000S" manufactured by Kolon Industries (a phenol modified aromatic hydrocarbon resin, a non-volatile content of 97 mass % and a specific gravity of the non-volatile content of 1.1)

{e} Reactive Diluent "CARDOLITE LITE 2513HP" manufactured by Cardolite Chemical (a non-volatile content of 100 mass % and a specific gravity of 1.1)

{f} Color pigment 1: "TIPAQUE CR50" manufactured by Ishihara Sangyo Kaisha, Ltd. (titanium dioxide, a non-volatile content of 100 mass % and a specific gravity of 4.1)

{g} Color pigment 2: "TAROX synthesized iron oxide LL-XLO" manufactured by Titan Kogyo, Ltd. (a yellow pigment, a non-volatile content of 100 mass % and a specific gravity of 4.1)

{h} Glass flake: "Glass Flake RFC140" manufactured by Nippon Glass Fiber Co., Ltd. (an average particle size of 149 μm, an average thickness of 28 μm, an aspect ratio of 5.3, an index of refraction of 1.5, a non-volatile content of 100 mass %, and a specific gravity of 2.5)

{i} Mica 1: "White Mica 200M" manufactured by Kirara Kabushiki Kaisha (an average particle size of 78 μm, an average thickness of 8 μm, an aspect ratio of 9.8, an index of refraction of 1.6, a non-volatile content of 100 mass %, and a specific gravity of 2.7)

{j} Mica 2: "MT-MICA D325W" manufactured by Mintech International (an average particle size of 39 μm, an average thickness of 7 μm, an aspect ratio of 5.6, an index of refraction of 1.6, a non-volatile content of 100 mass %, and a specific gravity of 2.8)

{k} Talc 1: "Talc DS34-N" manufactured by Fuji Talc Industrial Co., Ltd. (an average particle size of 17 μm, an average thickness of 4 μm, an aspect ratio of 4.3, an index of refraction of 1.6, a non-volatile content of 100 mass %, and a specific gravity of 2.7)

{l} Talc 2: "Talc SP42" manufactured by Fuji Talc Industrial Co., Ltd. (an average particle size of 14 μm, an average thickness of 4 μm, an aspect ratio of 3.5, an index of refraction of 1.6, a non-volatile content of 100 mass %, and a specific gravity of 2.7)

{m} Talc 3: "Talc TPA-25" manufactured by Fuji Talc Industrial Co., Ltd. (an average particle size of 8 μm, an average thickness of 3 μm, an aspect ratio of 2.7, an index of refraction of 1.6, a non-volatile content of 100 mass %, and a specific gravity of 2.7)

{n} Curing agent 1: "CARDOLITE NX-5168" manufactured by Cardolite Chemical (modified aliphatic polyamine, a Gardner color scale of 15, a non-volatile content of 64 mass %, and a specific gravity of the non-volatile content of 1.2)

{o} Curing agent 2: "Daitocurar D-6043" manufactured by Daito Sangyo Co., Ltd. (modified aliphatic polyamine, a Gardner color scale of 5, a non-volatile content of 100 mass %, and a specific gravity of 1.1)

An average particle size, an average thickness, an aspect ratio, and an index of refraction of the scaly pigment and the extender pigment, a Gardner color scale of the curing agent, as well as a contrast ratio of the dry coating film of each colored paint having dry coating film thickness T (a contrast ratio at dry coating film thickness T of each colored paint) were measured in accordance with a method as follows.

{A} Average Particle Size, Average Thickness, and Aspect Ratio of Scaly Pigment and Extender Pigment A particle shape image analyzer ("PITA-3" manufactured by Seishin Enterprise Co., Ltd.) was used to take a photograph of an image of particles of the scaly pigment or the extender pigment, 50 particles photographed in a direction perpendicular to a main surface of the particles were selected in the obtained photographed image, and a long diameter and a short diameter of each particle were measured. An average value of the long diameters of the 50 particles was defined as an average particle size of the scaly pigment or the extender pigment, and an average value of the short diameters of the 50 particles was defined as an average thickness of the scaly pigment or the extender pigment. An aspect ratio was calculated by dividing the average particle size by the average thickness. Measurement conditions for the particle shape image analyzer are as follows.

Dispersion medium of sample solution and flow rate thereof: water, 0.42 μL/second Type of first and second carrier solutions and flow rate thereof: water, 500 μL/second Magnification for observation of photographed image: 10×

{B} Index of Refraction of Scaly Pigment and Extender Pigment

An index of refraction of the scaly pigment and the extender pigment was measured under JIS K 0062: 1992.

{C} Gardner Color Scale of Curing Agent

A Gardner color scale was measured under JIS K 5600-2-1: 2014. The Gardner color scale of curing agent 1 was measured after a volatile content was removed under reduced pressure and heating.

{D} Contrast Ratio at Dry Coating Film Thickness T of Each Colored Paint

A contrast ratio of the dry coating film of each colored paint having a film thickness at set value T for a dry coating film thickness was measured under JIS K 5600-4-1: 1999.

Examples 14 to 28 and Comparative Examples 4 to 6: Formation of Dry Coating Film Thickness with Colored Paint A test panel was fabricated by coating a pear skin finished steel panel of 900 mm×900 mm with shopprimer ("Nippon Ceramo Gray" or "Nippon Ceramo Brown" manufactured by Nippon Paint Marine Coatings Co., Ltd.) to a dry film thickness of 15 μm, followed by drying at a room temperature for 24 hours or longer. Tables 3 to 5 show "Nippon Ceramo Gray" and "Nippon Ceramo Brown" as being abbreviated as "gray" and "brown", respectively.

Then, an anti-corrosive coating film was formed by coating a surface of the shopprimer of the obtained test panel with a colored paint shown in Tables 3 to 5 which had been formulated above and obtained by mixing two liquids of the main agent and the curing agent with airless spraying, followed by drying at a room temperature for 24 hours. Here, in each of Examples and Comparative Examples, a plurality of dry anti-corrosive coating films having respective dry film thicknesses shown in Tables 3 to 5 were formed. A dry film thickness of each coating film was measured with an electromagnetic coating thickness tester "COATING THICKNESS TESTER LE-900" manufactured by Kett Electric Laboratory.

Color difference ΔE between the obtained anti-corrosive coating film having each dry film thickness and set value T for the target dry coating film thickness of each colored paint was found through measurement with the use of a tristimulus colorimeter SM color computer "SM-7CH" manufactured by Suga Test Instruments Co., Ltd. in conformity with JIS K 5600-4-5: 1999 and calculation in conformity with JIS K 5600-4-6: 1999. Tables 3 to 5 show results. Performance to hide the underlying substrate of the anti-corrosive coating film exhibiting each dry film thickness in a state of the wet coating film (performance of the anti-corrosive coating film to hide the shopprimer coating film) was visually observed and evaluated based on criteria blow. Tables 3 to 5 also show results. FIGS. 1 to 8 each show a graph of Examples and Comparative Examples in which the abscissa represents dry film thicknesses (μm) shown in Tables 3 to 5 and the ordinate represents ΔE shown in Tables 3 to 5.

A: hidden
B: lack of hiding to some extent
C: lack of hiding in general

ΔE at dry film thickness of 0 μm in Tables 3 to 5 means a color difference between the anti-corrosive coating film having dry film thickness T and the surface of the object to be coated (the surface of the shopprimer coating film), and is the same in meaning as color difference ΔE3 described above.

TABLE 3

| | | Example 14 | | Example 15 | | Example 16 | | Example 17 | | Example 18 | | Example 19 | | Example 20 | |
|---|---|---|---|---|---|---|---|---|---|---|---|---|---|---|---|
| Anti-Corrosive Coating Film | Paint No. T (μm) Surface of Object to be Coated | Example 1 320 Gray | | Example 2 320 Gray | | Example 3 320 Gray | | Example 4 320 Gray | | Example 5 320 Gray | | Example 6 320 Gray | | Example 7 320 Gray | |
| Dry Film Thickness (μm) | | ΔE | Hiding Performance | ΔE | Hiding Performance | ΔE | Hiding Performance | ΔE | Hiding Performance | ΔE | Hiding Performance | ΔE | Hiding Performance | ΔE | Hiding Performance |
| 0 | | 33.1 | — | 33.7 | — | 35.0 | — | 32.3 | — | 29.7 | — | 30.5 | — | 30.5 | — |
| 40 | | 17.5 | C | 17.5 | C | 16.9 | C | 16.1 | C | 14.4 | C | 14.9 | C | 16.2 | C |
| 70 | | 12.3 | C | 12.3 | C | 13.9 | C | 12.5 | C | 11.5 | C | 12.2 | C | 12.0 | C |
| 120 | | 9.0 | C | 9.2 | C | 10.2 | C | 9.6 | C | 8.0 | C | 9.1 | C | 9.3 | C |
| 150 | | 7.0 | C | 7.4 | C | 8.1 | C | 7.6 | C | 6.0 | C | 7.6 | C | 7.6 | C |
| 180 | | 5.0 | C | 5.6 | C | 5.9 | C | 5.7 | C | 4.0 | C | 5.6 | C | 5.5 | C |
| 190 | | 4.3 | C | 5.0 | C | 5.2 | C | 5.1 | C | 3.5 | C | 5.0 | C | 4.8 | C |
| 200 | | 3.4 | C | 4.4 | C | 4.3 | C | 4.6 | C | 3.0 | C | 4.3 | C | 4.3 | C |
| 220 | | 2.5 | C | 3.5 | C | 3.1 | C | 3.4 | C | 2.3 | C | 3.2 | C | 3.0 | C |
| 230 | | 2.3 | C | 2.9 | C | 2.7 | C | 3.0 | C | 2.0 | C | 2.8 | C | 2.1 | C |
| 240 | | 1.6 | C | 2.4 | C | 2.3 | C | 2.5 | C | 1.6 | C | 2.3 | C | 2.1 | C |
| 260 | | 1.2 | B | 1.5 | C | 1.4 | C | 1.6 | C | 1.1 | B | 1.4 | C | 1.3 | C |
| 270 | | 0.9 | B | 1.1 | B | 1.4 | C | 1.3 | C | 0.9 | B | 1.2 | B | 1.0 | B |
| 290 | | 0.5 | B | 0.6 | B | 0.6 | B | 0.6 | B | 0.7 | B | 0.6 | B | 0.6 | B |
| 320 | | 0.0 | A | 0.0 | A | 0.0 | A | 0.0 | A | 0.0 | A | 0.0 | A | 0.0 | A |

TABLE 3-continued

| | | | | | | | | | | | | | | |
|---|---|---|---|---|---|---|---|---|---|---|---|---|---|---|
| 350 | 0.0 | A | 0.1 | A | 0.1 | A | 0.1 | A | 0.1 | A | 0.1 | A | 0.1 | A |
| 360 | 0.0 | A | 0.1 | A | 0.1 | A | 0.1 | A | 0.1 | A | 0.1 | A | 0.1 | A |
| 370 | 0.1 | A | 0.1 | A | 0.1 | A | 0.1 | A | 0.1 | A | 0.1 | A | 0.1 | A |
| 420 | 0.1 | A | 0.1 | A | 0.2 | A | 0.2 | A | 0.2 | A | 0.2 | A | 0.2 | A |

TABLE 4

| | | Example 21 | | Example 22 | | Example 23 | | Example 24 | | Example 25 | | Example 26 | |
|---|---|---|---|---|---|---|---|---|---|---|---|---|---|
| Anti-Corrosive Coating Film Surface of Object to be Coated | Paint No. T (μm) | Example 8 320 Gray | | Example 9 320 Gray | | Example 10 520 Gray | | Example 11 1000 Gray | | Example 1 320 Brown | | Example 2 320 Brown | |
| Dry Film Thickness (μm) | | ΔE | Hiding Performance | ΔE | Hiding Performance | ΔE | Hiding Performance | ΔE | Hiding Performance | ΔE | Hiding Performance | ΔE | Hiding Performance |
| 0 | | 30.9 | — | 27.8 | — | 33.2 | — | 34.0 | — | 26.5 | — | 28.1 | — |
| 40 | | 16.0 | C | 16.1 | C | 23.5 | C | 27.8 | C | 15.8 | C | 15.4 | C |
| 70 | | 11.5 | C | 10.9 | C | 18.1 | C | 24.9 | C | 11.8 | C | 12.1 | C |
| 120 | | 8.9 | C | 7.5 | C | 13.9 | C | 21.3 | C | 8.4 | C | 8.9 | C |
| 150 | | 7.1 | C | 5.7 | C | 12.0 | C | 19.8 | C | 6.5 | C | 7.2 | C |
| 180 | | 5.5 | C | 3.8 | C | 10.0 | C | 18.2 | C | 4.8 | C | 5.1 | C |
| 190 | | 4.8 | C | 3.2 | C | 9.5 | C | 17.9 | C | 4.2 | C | 4.4 | C |
| 200 | | 4.4 | C | 2.8 | C | 9.0 | C | 17.4 | C | 3.5 | C | 3.7 | C |
| 220 | | 2.9 | C | 2.2 | C | 8.5 | C | 16.5 | C | 2.5 | C | 2.6 | C |
| 230 | | 2.2 | C | 2.1 | C | 7.7 | C | 16.1 | C | 2.1 | C | 2.2 | C |
| 240 | | 2.2 | C | 1.7 | C | 7.3 | C | 16.0 | C | 1.8 | C | 1.9 | C |
| 260 | | 1.2 | B | 1.0 | B | 6.4 | C | 15.0 | C | 1.1 | B | 1.3 | C |
| 270 | | 1.1 | B | 0.8 | B | 5.6 | C | 14.2 | C | 0.8 | B | 1.2 | B |
| 290 | | 0.6 | B | 0.5 | B | 4.5 | C | 13.6 | C | 0.6 | B | 0.7 | B |
| 320 | | 0.0 | A | 0.0 | A | 3.5 | C | 12.7 | C | 0.0 | A | 0.0 | A |
| 350 | | 0.1 | A | 0.1 | A | 2.5 | C | 11.5 | C | 0.1 | A | 0.1 | A |
| 360 | | 0.1 | A | 0.1 | A | 2.2 | C | 11.0 | C | 0.1 | A | 0.1 | A |
| 370 | | 0.1 | A | 0.1 | A | 2.1 | C | 10.5 | C | 0.1 | A | 0.1 | A |
| 420 | | 0.2 | A | 0.1 | A | 1.2 | C | 9.1 | C | 0.1 | A | 0.2 | A |
| 470 | | | | | | 0.5 | B | 7.0 | C | | | | |
| 520 | | | | | | 0.0 | A | 6.0 | C | | | | |
| 680 | | | | | | 0.1 | A | 2.6 | C | | | | |
| 700 | | | | | | | | 2.2 | C | | | | |
| 800 | | | | | | | | 1.3 | C | | | | |
| 900 | | | | | | | | 0.5 | B | | | | |
| 1000 | | | | | | | | 0.0 | A | | | | |
| 1300 | | | | | | | | 0.2 | A | | | | |

TABLE 5

| | | Example 27 | | Example 28 | | Comparative Example 4 | | Comparative Example 5 | | Comparative Example 6 | |
|---|---|---|---|---|---|---|---|---|---|---|---|
| Anti-Corrosive Coating Film Surface of Object to be Coated | Paint No. T (μm) | Example 12 320 Gray | | Example 13 320 Gray | | Comparative Example 1 220 Gray | | Comparative Example 2 320 Gray | | Comparative Example 3 520 Gray | |
| Dry Film Thickness (μm) | | ΔE | Hiding Performance | ΔE | Hiding Performance | ΔE | Hiding Performance | ΔE | Hiding Performance | ΔE | Hiding Performance |
| 0 | | 33.9 | — | 33.1 | — | 32.0 | — | 33.0 | — | 33.0 | — |
| 40 | | 18.0 | C | 19.2 | C | 15.7 | C | 13.0 | C | 19.5 | C |
| 70 | | 13.2 | C | 13.5 | C | 8.5 | C | 8.0 | C | 12.0 | C |
| 120 | | 9.6 | C | 9.9 | C | 3.8 | C | 4.0 | C | 7.0 | C |
| 150 | | 7.7 | C | 8.0 | C | 2.2 | C | 2.5 | C | 5.0 | C |
| 180 | | 5.7 | C | 5.7 | C | 1.4 | C | 1.5 | C | 3.9 | C |
| 190 | | 5.1 | C | 5.0 | C | 1.2 | B | 1.1 | B | 3.2 | C |
| 200 | | 4.4 | C | 4.3 | C | 0.5 | B | 0.8 | B | 3.0 | C |
| 220 | | 3.0 | C | 3.1 | C | 0.0 | A | 0.4 | B | 2.2 | C |
| 230 | | 2.3 | C | 2.2 | C | 0.1 | A | 0.3 | B | 1.8 | C |
| 240 | | 1.8 | C | 1.7 | C | 0.1 | A | 0.2 | B | 1.5 | C |
| 260 | | 1.3 | C | 1.0 | C | 0.1 | A | 0.1 | A | 1.1 | B |
| 270 | | 0.8 | B | 0.8 | B | 0.2 | A | 0.1 | A | 0.8 | B |
| 290 | | 0.5 | B | 0.7 | B | 0.2 | A | 0.1 | A | 0.7 | B |
| 320 | | 0.0 | A | 0.0 | A | | | 0.0 | A | 0.6 | B |
| 350 | | 0.1 | A | 0.1 | A | | | 0.0 | A | 0.4 | B |

TABLE 5-continued

| | | | | | | | | |
|---|---|---|---|---|---|---|---|---|
| 360 | 0.2 | A | 0.1 | A | 0.0 | A | 0.3 | B |
| 370 | 0.1 | A | 0.1 | A | 0.1 | A | 0.2 | B |
| 420 | 0.2 | A | 0.2 | A | 0.1 | A | 0.1 | A |
| 470 | | | | | | | 0.1 | A |
| 520 | | | | | | | 0.0 | A |
| 680 | | | | | | | 0.1 | A |

The invention claimed is:

1. A method for forming a dry coating film with a colored paint on a surface of an object to be coated, comprising the steps of:
[1] setting a dry coating film thickness T such that a coating film having the dry coating film thickness T and formed of the colored paint hides the surface of the object to be coated, and T is selected from a range not smaller than 320 μm;
[2] formulating or preparing the colored paint such that it will satisfy a color difference ΔE1 defined in (c) below, the colored paint containing at least a binder resin, a scaly pigment and a color pigment, the scaly pigment satisfying conditions (a) and (b) below:
  (a) the scaly pigment having an average particle size from 10 to 300 μm, an average thickness from 2 to 50 μm and an aspect ratio from 2 to 20, the aspect ratio being defined as the average particle size/the average thickness,
  (b) a content of the scaly pigment is from 5 to 45 volume % in components forming the coating film, and
  (c) the color difference ΔE1 between the coating film having the dry coating film thickness T and formed of the colored paint and a coating film having a dry coating film thickness of 0.7 T and formed of the colored paint is not smaller than 2.0, wherein the color difference ΔE1 is a color difference in accordance with JIS K 5600-4-5:1999;
[3] coating the surface of the object to be coated with the colored paint until the surface is hidden by the coating film formed of the colored paint; and
[4] obtaining a dry coating film by drying the coating film obtained in the step [3];
wherein the binder resin comprises an epoxy resin or a modified product thereof selected from the group consisting of a carboxylic acid modified epoxy resin, an amine modified epoxy resin, a phosphoric acid modified epoxy resin, a petroleum resin modified epoxy resin, a rubber modified epoxy resin and mixtures thereof.

2. The method according to claim 1, wherein the colored paint further satisfies a condition (e) that a color difference ΔE2 between the coating film having the dry coating film thickness T and formed of the colored paint and a coating film having a dry coating film thickness of 1.3 T and formed of the colored paint is smaller than 1, wherein the color difference ΔE2 is a color difference in accordance with JIS K 5600-4-5:1999.

3. The method according to claim 1, wherein the colored paint further satisfies a condition (f) that a color difference ΔE3 between the coating film having the dry coating film thickness T and formed of the colored paint and the surface of the object to be coated is not smaller than 20, wherein the color difference ΔE3 is a color difference in accordance with JIS K 5600-4-5:1999.

4. The method according to claim 1, wherein the coating film having the dry coating film thickness T and formed of the colored paint has a contrast ratio from 0.90 to 0.98.

5. The method according to claim 1, wherein the colored paint further contains a curing agent.

6. The method according to claim 5, wherein the curing agent has a Gardner color scale not greater than 18.

7. The method according to claim 1, wherein a content of the color pigment is from 0.01 to 3 volume % in the components forming the coating film.

8. The method according to claim 1, wherein the scaly pigment is at least one type of pigment selected from the group consisting of talc, mica, and glass flake.

9. The method according to claim 1, wherein the color pigment contains titanium dioxide.

10. The method according to claim 1, wherein the surface of the object to be coated is made of steel or a surface of an undercoat layer of the object to be coated.

11. The method according to claim 1, wherein the aspect ratio of the scaly pigment is 2 to 9.8.

12. The method according to claim 1, wherein step [4] is only performed one time.

* * * * *